(12) United States Patent
Yang (10) Patent No.: US 9,607,160 B2
(45) Date of Patent: Mar. 28, 2017

(54) METHOD AND APPARATUS FOR PROVIDING STRING ENCRYPTION AND DECRYPTION IN PROGRAM FILES

(71) Applicant: Tencent Technology (Shenzhen) Company Limited, Shenzhen (CN)

(72) Inventor: Zuke Yang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/610,620

(22) Filed: Jan. 30, 2015

(65) Prior Publication Data

US 2015/0169881 A1   Jun. 18, 2015

Related U.S. Application Data

(63) Continuation of application No. PCT/CN2014/082318, filed on Jul. 16, 2014.

(30) Foreign Application Priority Data

Sep. 13, 2013 (CN) .......................... 2013 1 0419056

(51) Int. Cl.
*G06F 21/60* (2013.01)
*G06F 17/30* (2006.01)

(52) U.S. Cl.
CPC ...... *G06F 21/602* (2013.01); *G06F 17/30082* (2013.01); *G06F 21/60* (2013.01)

(58) Field of Classification Search
CPC .......................... G06F 21/602; G06F 17/30082

(Continued)

(56) References Cited

U.S. PATENT DOCUMENTS 6,266,416 B1 *  7/2001  Sigbjørnsen .......... G06F 21/123
                                              380/201
7,054,443 B1 *  5/2006  Jakubowski ..... G11B 20/00086
                                              380/201

(Continued)

FOREIGN PATENT DOCUMENTS

CN          1885298 A    12/2006
CN        102779029 A    11/2012

OTHER PUBLICATIONS

Tencent Technology, ISRWO, PCT/CN2014/082318, Nov. 26, 2014, 8 pgs.

(Continued)

*Primary Examiner* — Matthew Henning
(74) *Attorney, Agent, or Firm* — Morgan, Lewis & Bockius LLP (57) ABSTRACT

A method of providing encryption and decryption of plaintext strings in a program file, includes: at a device having one or more processors and memory: marking each of a plurality of plaintext strings in a source file with a respective marking macro (e.g., Decrypt); scanning (e.g., using a reflection tool) for the respective marking macros to identify the plurality of plaintext strings in the source code; generating a respective ciphertext string for each of the plurality plaintext strings that have been identified; and storing the plurality of plaintext strings in a dictionary file, where each plaintext string is indexed by a respective hash value computed from the plaintext string, and where the respective hash value for each of the plaintext strings is used to retrieve the respective ciphertext string of the plaintext string from the dictionary file during program execution.

18 Claims, 6 Drawing Sheets

(58) Field of Classification Search
USPC .......................................................... 713/189
See application file for complete search history.

(56) References Cited

U.S. PATENT DOCUMENTS

| | | | |
|---|---|---|---|
| 7,689,547 B2* | 3/2010 | Cristofor | G06F 17/30312 380/28 |
| 2003/0142818 A1 | 7/2003 | Raghunathan et al. | |
| 2003/0221116 A1* | 11/2003 | Futoransky | G06F 21/16 713/189 |
| 2008/0118150 A1* | 5/2008 | Balakrishnan | G06F 17/2276 382/176 |
| 2009/0323972 A1* | 12/2009 | Kohno | G06F 21/6245 380/284 |

OTHER PUBLICATIONS

Tencent Technology,IPRP, PCT/CN2014/082318, Mar. 15, 2016, 5 pgs.

* cited by examiner

METHOD AND APPARATUS FOR PROVIDING STRING ENCRYPTION AND DECRYPTION IN PROGRAM FILES

RELATED APPLICATIONS

This application is a continuation application of PCT Patent Application No. PCT/CN2014/082318, entitled "METHOD AND APPARATUS FOR PROVIDING STRING ENCRYPTION AND DECRYPTION IN PROGRAM FILES" filed on Jul. 16, 2014, which claims priority to Chinese Patent Application No. 201310419056.6, entitled "METHOD AND APPARATUS FOR STRING ENCRYPTION AND DECRYPTION," filed on Sep. 13, 2013, both of which are incorporated by reference in its entirety.

TECHNICAL FIELD

The present disclosure relates generally to the field of computer data processing, and in particular, to method and apparatus for string encryption and decryption in program files.

BACKGROUND

When source code is complied and converted into executable code (e.g., .exe or .dll code), some strings (e.g., strings enclosed in quotes " ") contained in the program source code are often left in the executable code in the form of plaintext easily readable and decipherable by a human reader. Such plaintext strings can be used as anchors for exploit and/or altering the executable code for unauthorized purposes, such as finding loopholes, devising security attacks, modifying critical data, etc. In order to improve data security, encryption and decryption of the plaintext strings in program files is needed.

In the prior art, a method for string encryption and decryption generally comprises the steps of:

Step S1: Scanning all the plaintext strings in the source code with a software development platform (e.g., Visual Studio, referred to as VS) tool.

Step S2: Substituting the plaintext strings by corresponding encrypted ciphertext strings in the source code and packaging them with decryption functions.

Step S3: Compiling the modified source code containing the substitution ciphertext strings to obtain executable code.

Step S4: Restoring the plaintext strings that have been substituted.

Step S5: Decrypting the ciphertext strings in real time when the program is running.

In the above method of string encryption and decryption, because the source code used in compiling is temporary source code containing substitution strings, namely the ciphertext strings, it is possible that the ciphertext strings may not match with the original plaintext strings after the debugging process. Moreover, risk exists in the substitution process itself. If an error occurs, it may cause the loss of the original source code containing the original plaintext strings, and the loss will be difficult to recover. Furthermore, due to the need for decrypting the ciphertext strings in real-time, if the plaintext string is called for frequently, it will affect the performance of the program. Additionally, in a multi-threaded mode, real-time decryption may require additional overhead for data locking, which may further affect the performance of the program, thus reducing the security in loading the program on the client terminal.

SUMMARY

The above deficiencies associated with the known techniques for string encryption and decryption in program files may be addressed by the techniques described herein.

In some embodiments, a method for providing string encryption and decryption in a program file includes: at a device having one or more processors and memory: marking each of a plurality of plaintext strings in a source file with a respective marking macro (e.g., Decrypt); scanning (e.g., using a reflection tool) for the respective marking macros to identify the plurality of plaintext strings in the source code; generating a respective ciphertext string for each of the plurality plaintext strings that have been identified; and storing the plurality of plaintext strings in a dictionary file, where each plaintext string is indexed by a respective hash value computed from the plaintext string, and where the respective hash value for each of the plaintext strings is used to retrieve the respective ciphertext string of the plaintext string from the dictionary during program execution In some embodiments, a device includes one or more processors and memory storing one or more programs for execution by the one or more processors. The one or more programs include instructions that cause the device to perform the method for providing navigation assistance as described above. In some embodiments, a non-transitory computer readable storage medium stores one or more programs including instructions for execution by one or more processors. The instructions, when executed by the one or more processors, cause the processors to perform the method as described above.

Various advantages of the present application are apparent in light of the descriptions below.

BRIEF DESCRIPTION OF DRAWINGS

The aforementioned implementation of the present application as well as additional implementations will be more clearly understood as a result of the following detailed description of the various aspects of the present application when taken in conjunction with the drawings.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the objectives, technical solutions, and advantages of the present application comprehensible, embodiments of the present application are further described in detail below with reference to the accompanying drawings.

Figure 1:
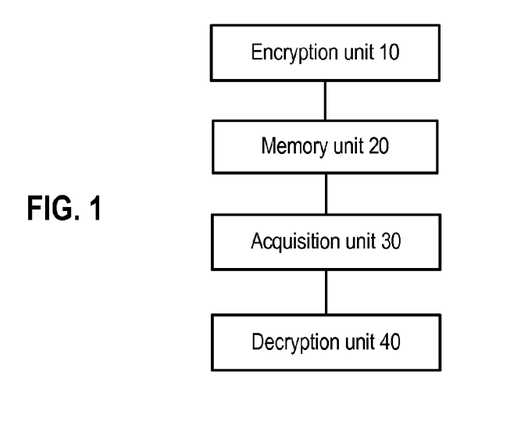
FIG. 1 is an exemplary apparatus for providing encryption and decryption of plaintext strings in a program file in accordance with some embodiments.

FIG. 1 is a schematic view of an apparatus for providing string encryption and decryption in a program file in accordance with some embodiments. As shown, the apparatus for providing string encryption and decryption in a program file includes an encryption unit 10, a memory unit 20, an acquisition unit 30 and a decryption unit 40.

Encryption unit 10 is used to encrypt plaintext strings into ciphertext strings. In the program source code, numerous string constants are often used, which may appear in the form of plaintext strings in a final output binary file (e.g., a binary executable file). These string constants that appeared in form of plaintext in the executable code are plaintext strings. The plaintext strings can be plaintext strings in the C++ source code (e.g., the text string enclosed in quotes " ", such as in the source code instruction printf("Hello World.")) developed on the VS development platform. The plaintext strings in the source code are usually meaningful names and phrases, and useful in presenting information to the user of the final program, and/or helping with understanding of the source code during code development. However, such plaintext strings, when left in the executable code after compilation of the source code, can make the code logic vulnerable to reverse engineering and alteration by others for unauthorized uses.

For illustration purposes, the description is made by taking plaintext strings in the C++ source code developed on the VS development platform as an example. In some embodiments, plaintext strings of the C++0x standard or above developed in the VS development environment (later than version VS2010) are adopted in the embodiments of the present disclosure.

In some embodiments, for the encryption unit 10 to encrypt the plaintext strings into corresponding ciphertext strings, the encryption unit 10 first scans for the plaintext strings in the source code via a reflection tool, and then encrypts each scanned plaintext string into a corresponding ciphertext string. For example: if there is a plaintext string "Hello World" in the original source code, the plaintext string "Hello World" in the code is scanned and discovered by the reflection tool, then the string "Hello World" is encrypted, and the plaintext string "Hello World" is encrypted and turned into a corresponding ciphertext string "HoWd" (Note the ciphertext string can be a sequence of symbols other than letters, e.g., "!!~^"). Since the ciphertext string "HoWd" is lack of readability, the encrypted ciphertext string is difficult to crack by a human reader. Note that, plaintext strings that are scanned and discovered do not refer to the program function and variable names written in a program language, instead, the plaintext strings are those strings that will not converted to machine code after compilation (or will remain in the same plaintext form after compilation). In many languages, the plaintext strings are strings enclosed in quotation marks " ". In some embodiments, the encryption unit 10 generates a dictionary for storing the ciphertext strings. Each unique entry of the ciphertext strings is indexed in the dictionary by a corresponding key (e.g., a hash value of the encrypted ciphertext string).

Conventionally, in the program files of software series (e.g., game software for a game), the plaintext strings remaining in the program files may be read by opening the DLL or EXE files, so the unencrypted program files can be easily cracked, which may cause losses of software makers. For example, the program files of the game may include codes for representing the life meter of a character in the game or the like. Some game plug-in makers may run a game cheat plug-in, by reading and modifying such codes which correspond to the value of the life meter of a game character or the like, which harms the interests of software makers. By increasing the difficulty for cracking the program with the encryption of plaintext strings, the security of software may be enhanced.

The memory unit 20 is used to store the ciphertext strings in a dictionary file. The memory unit 20 stores the ciphertext strings into a dictionary file, wherein the ciphertext strings are obtained by encrypting the scanned plaintext strings. The dictionary file may be a dictionary file automatically generated in the encryption process of the plaintext strings. The dictionary file may also be a dictionary file prepared prior to the encryption. In some embodiments, the ciphertext strings are directly stored in a dictionary file, and the original plaintext strings may be obtained with a decryption algorithm from the ciphertext strings, such that the operation risk in replacing the plaintext strings with ciphertext strings during compilation can be avoided, also the situation of losing the original plaintext strings due to errors in the decryption process can be avoided. Meanwhile, since the ciphertext strings are directly stored in the dictionary file, the mismatch between the original code and the compiled code due to debugging may be avoided.

The acquisition unit 30 is used to obtain the index of a ciphertext string. The index of the ciphertext string is obtained from the conversion of a plaintext string corresponding to the ciphertext strings during a source code compiling process. The index is used to index the ciphertext string corresponding to the plaintext string in the dictionary, so that during the execution of the program code, the ciphertext string can be recalled during a code decryption process. The index of a ciphertext string may be a hash value obtained using a hash algorithm. The index may also be a character code with marking and indexing function that is from the other algorithms. The hash algorithm may be based on FNV-1a, and realized by the C++ template programming.

The decryption unit 40 is used to retrieve a ciphertext string from the dictionary file according to the index of the ciphertext string, and decrypt the ciphertext string. A ciphertext string and the index of the ciphertext string are both generated from the corresponding plaintext string, wherein the ciphertext string is from the encryption of the plaintext string, and the index of the ciphertext string is generated from the corresponding plaintext string through a certain algorithm. Such an algorithm may be hash algorithm, and also may be other algorithms capable of obtaining marking values or index values. Therefore, with the index of the ciphertext string, the decryption unit 40 may directly retrieve the corresponding ciphertext string from the dictionary file which stores the ciphertext string, and directly decrypts the ciphertext string into the corresponding plaintext string. Note that, in some embodiments, the decryption unit 40 may be located on a separate device from the device including the encryption unit 10, memory unit 20, and acquisition unit 30. For example, a programmer's device may include all of the encryption unit 10, memory unit 20, acquisition unit 30 and decryption unit 40. But execution of the program (e.g., on a gamer's device) only requires the decryption unit 40.

In some embodiments, the apparatus for providing string encryption and decryption in program files which comprises the encryption unit 10, memory unit 20, acquisition unit 30 and decryption unit 40 encrypts and decrypts the plaintext strings in program files, wherein the memory unit 20 stores the ciphertext strings encrypted by the encryption unit 10 into a dictionary file, the acquisition unit 30 uses the index of a ciphertext string to retrieve a ciphertext string from the dictionary file so that the decryption unit 40 can decrypt the ciphertext string. In the embodiment of the present application, the ciphertext string is directly stored in the dictionary file, and the ciphertext string is retrieved from the dictionary file according to the index of the ciphertext string and is decrypted during run time, without replacing the plaintext string into ciphertext strings in the source code before compilation. Therefore the problem of code mismatching due to replacing the plaintext string with a ciphertext string is avoided, and also the problem of losing the original source code and difficulty in recovering the lost code can be avoided. Moreover, the security for the client programs in the loading and execution process is enhanced. Loading failure such as breakdown or the like, due to errors in the plaintext strings decryption process can be avoided, the security for the client programs is further enhanced.

It should be noted that, in the present disclosure, "encrypt" could be referred to as "hide" or "conceal", "decrypt" could be referred to as "restore" or "plainly display". Accordingly, encrypting plaintext strings could be referred to as hiding the plaintext strings, decrypting ciphertext strings could be referred to as restoring or displaying ciphertext strings.

Figure 2:
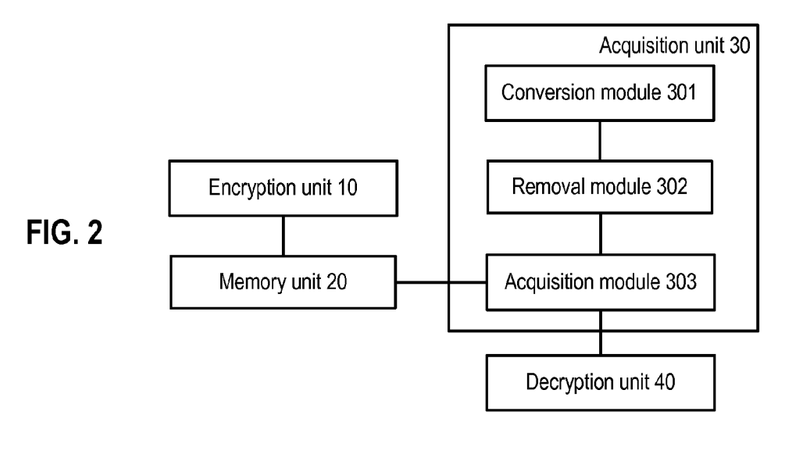
FIG. 2 is an exemplary apparatus for providing encryption and decryption of plaintext strings in a program file in accordance with some embodiments.

FIG. 2 is a schematic view of the apparatus for providing string encryption and decryption in a program file in accordance with some embodiments. This apparatus may serve as a preferred embodiment of the apparatus shown in FIG. 1.

As shown in FIG. 2, the apparatus for providing string encryption and decryption in a program file includes an encryption unit 10, a memory unit 20, an acquisition unit 30 and a decryption unit 40, where the acquisition unit 30 further includes a conversion module 301, a removal module 302, and an acquisition module 303.

The respective functions of encryption unit 10, memory unit 20 and decryption unit 40 are the same as those of the encryption unit 10, memory unit 20 and decryption unit 40 of the apparatus shown in FIG. 1, and the description of which is not repeated here.

In some embodiments, the conversion module 301 is used to convert plaintext strings into their respective hash values, where the hash values are used to index the ciphertext strings corresponding to the plain strings. The hash values serve as the indices of ciphertext strings and are used to look up the ciphertext strings during program loading. The hash values are obtained from the conversion of plaintext strings during source code compilation. A hash value is obtained by mapping a binary value of arbitrary length into a smaller binary value of fixed length through a hash algorithm. The hash value is a unique and extremely compact numerical representation of a piece of data (e.g., the plaintext string). For example, when there is a plaintext string in the source code, if one of the letters in the plaintext string is changed, the hash value produced according to the plaintext string before it is changed is different from the hash value produced according to the plaintext string after it is changed. Therefore, each of the hash values used as the index of a ciphertext string is unique. The hash value can be used to accurately index and retrieve a ciphertext string corresponding to the index of the ciphertext string from the dictionary file.

The removal module 302 is used to remove plaintext strings from the executable program files. Since the plaintext strings are string constants, which may be easily read from the executable code, the entire application program composed of executable codes is easy to be cracked. Therefore, during the encryption process for a plaintext string in the source code, after the conversion module 301 converts the plaintext string into a hash value, the corresponding plaintext string in the source code should be removed through the compilation and linking process that converts the original source code to the executable code. Although the plaintext string is still readable in the original source code, the executable code does not include the plaintext string. The plaintext strings in the original source code may be static constants, or non-static constants. After the plaintext strings are removed by the removal module 302, the plaintext strings are no longer directly readable in their original form from the executable file, thus the security of encryption is ensured.

The acquisition module 303 is used to obtain the index of a ciphertext string by obtaining the hash value of the corresponding plaintext string of the ciphertext string. The hash value is used as the index of the ciphertext string in the dictionary. Therefore, obtaining the hash value is obtaining the index of the ciphertext string.

The conversion module 301 in accordance with some embodiments, converts the plaintext strings into respective hash values during source code compilation. In some embodiments, the hash algorithm used in the conversion process may be a FNV-0 algorithm, FNV-1 algorithm or FNV-1a algorithm. In some embodiments, FNV-1a algorithm is preferred, which is implemented with a C++ template. During compilation, the hash algorithm for plaintext strings is unfolded. In the following example, the compiler adopted should support C++0x standard or above, and all the related details of the compiler are in accordance with according to MSVC10:

```
Struct Hash
{
    template <unsigned int N, unsigned int I>
    Struct Helper
    {
        _forceinline static unsigned int Calculate(const char (&str)[N] )
        {
            return (Helper<N, I- 1>::Calculate(str)^ str[I- 1] )* PRIME;
        }
    };
```

The above code segment is used to calculate the hash value for the Ith character in a string with a length of N.

```
template <unsigned int N>
Struct Helper<N, 1>
{
    _forceinline static unsigned int Calculate(const char (&str)[N] )
    {
        return (OFFSET^ str[0] )* PRIME;
    }
};
```

The above code segment is used to calculate the hash value for the last character in the string with a length of N.

```
template <unsigned int N>
static unsigned int Calculate(const char (&str)[N] )
{
    return Helper<N, N>::Calculate(str);
}
}
```

With the iterative process in above two pieces of code, the hash value for each character in the string with a length of N is calculated, the respective hash values for all characters in a plaintext string are synthesized as a hash value for the plaintext string with a length of N.

The above codes include several iterative processes, the expression of each iterative process is written as a constant expression, which may be optimized by the compiler to be a constant hash value. As the keyword "_forceinline" is added, in the iterative process, the entire iterative process may be inlined into a constant expression. Theoretically, as long as the compiler is capable of supporting multiple-layer template unfolding, plaintext strings of arbitrary length may be converted to hash values.

After the optimization option of /O2 or above is enable on the compiler, the foregoing plaintext string will be directly optimized into a constant hash value in the assembly code, for example:

```
printf("%d", Hash:: Calculate("Hello World"));
00BB1000    push    45C9753Fh      // Hash of "Hello World"
00BB1005    push    0BB210Ch
00BB100A    call    dword ptr ds:[0BB2090h]
```

In the above code, the hash value for "Hello World" is calculated as 45C9753Fh.

Figure 3:
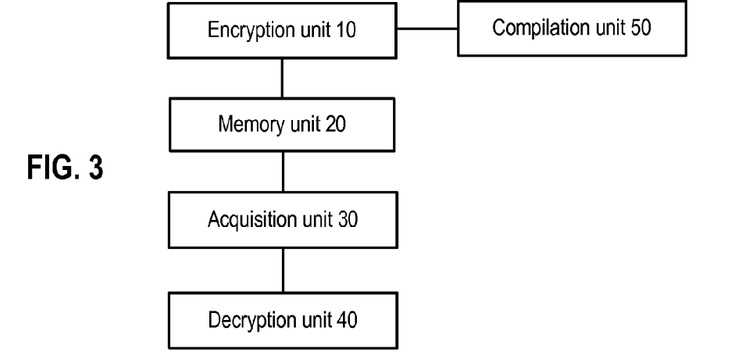
FIG. 3 is an exemplary apparatus for providing encryption and decryption of plaintext strings in a program file in accordance with some embodiments.

FIG. 3 is a schematic view of an apparatus for providing string encryption and decryption in accordance with some embodiments. The apparatus may serve as a preferred embodiment of the apparatus shown in FIG. 1. As shown in FIG. 3, the apparatus for providing string encryption and decryption in a program file includes an encryption unit 10, a memory unit 20, an acquisition unit 30 and a decryption unit 40, it further includes a compilation unit 50.

The function of encryption unit 10, memory unit 20 and decryption unit 40 in this embodiment is same as that of the encryption unit 10, memory unit 20 and decryption unit 40 of the embodiment shown in FIG. 1, and related description will not be repeated here.

The compilation unit 50 is used to compile a ciphertext string (as part of the source file) to obtain an executable file, after a plaintext string is encrypted into the ciphertext string.

In addition to the function of the decryption unit 40 as shown in the embodiment of FIG. 1, the decryption unit 40 is used to decrypt the ciphertext string and put the result into a pre-allocated buffer during the loading process for the executable file.

The executable file made from the compilation of the ciphertext strings may be a .DLL file or an .EXE file (or other types of executable files). The executable file may be loaded in a computer operating system. At the time of the executable file being loaded, the ciphertext string in the dictionary file is decrypted into the original plaintext string which is then stored in the pre-allocated buffer. Therefore, there's no need to decrypt the ciphertext string in real-time during execution each time the ciphertext string is called for, such that the problem of frequently repeating the decryption of the ciphertext string will be avoided, and the performance of a client program will not be influenced. In addition, the extra overhead for real-time decryption (e.g., the locking of data) under a multithreaded execution mode will be avoided, which improves the efficiency of the program.

Figure 4:
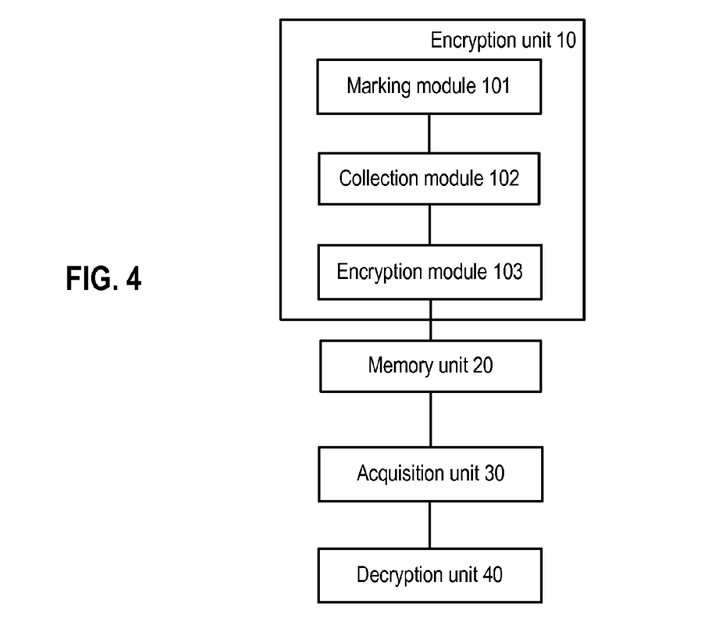
FIG. 4 is an exemplary apparatus for providing encryption and decryption of plaintext strings in a program file in accordance with some embodiments.

FIG. 4 is a schematic view of the apparatus for providing string encryption and decryption in a program file in accordance with some embodiments. The apparatus may serve as a preferred embodiment of the apparatus shown in FIG. 1.

As shown in FIG. 4, the apparatus for string encryption and decryption of this embodiment includes an encryption unit 10, a memory unit 20, an acquisition unit 30 and a decryption unit 40. The encryption unit 10 further includes a marking module 101, a collection module 102 and an encryption module 103.

The function of the memory unit 20, acquisition unit 30 and decryption unit 40 in this embodiment is same as that of the memory unit 20, acquisition unit 30 and decryption unit 40 of the embodiment shown in FIG. 1, and related description will not be repeated herein.

The marking module 101 is used to respectively mark each of a plurality of plaintext strings in the source code with a marking macro. During source code development, marking module 101 marks each plaintext string with a marking macro, wherein one plaintext string corresponds to one marking macro. The marking macros in the source code are used to recognize each different plaintext string, so as to encrypt and obtain the corresponding ciphertext strings of the different plaintext strings. For example, in the source code expression printf(DECRYPT("Hello World"));

the marking macro "DECRYPT" is used to mark the plaintext string "Hello World", therefore, in the subsequent scanning process, the plaintext string "Hello World" may be recognized by just scanning for the marking macro "DECRYPT". This will make it very convenient to collect all the plaintext strings.

The collection module 102 is used to collect a plurality of plaintext strings by scanning for the marking macros in the source code. A reflection tool is used to add the special marking macros in the source code created during normal code development. Before each compilation process is started on the source code files, the reflection tool will scan for these special marks (e.g., the marking macros) and automatically generate the dictionary entries for the ciphertext strings and the dictionary file. After the marking module 101 marks a plurality of plaintext strings in the original source code, the collection module 102 scans the marking macros with the reflection tool to collect the plurality of plaintext strings, so as to encrypt the collected plurality of plaintext strings respectively.

The encryption module 103 is used to respectively encrypt the collected plurality of plaintext strings into a plurality of ciphertext strings, wherein, the memory unit 20 is used to store the plurality of encrypted ciphertext strings in the dictionary file. The plurality of plaintext strings collected by the collection module 102 are encrypted through the encryption module 103 into a plurality of ciphertext strings, wherein each of the plurality of plaintext strings corresponds to a respective ciphertext string of the plurality of ciphertext strings. The memory unit 20 stores the plurality of ciphertext strings obtained by encrypting the plurality of plaintext strings into the dictionary file, which is used for looking up the ciphertext strings. In some embodiments, it's preferable to use a hash value as the index for a ciphertext string, so as to index the ciphertext string in the dictionary file.

In some embodiments, the marking macro may be further optimized. By using a lambda or anonymous function, the look-up result of the ciphertext string may be cached such that it only take a few look-up operations each time for the repeated calling of the same ciphertext string. For example, at the first time when the ciphertext string corresponding to the plaintext string "Hello World" is retrieved, firstly the hash value is used to look-up the corresponding entry in the dictionary file, wherein the hash value used for the look-up is the hash value obtained from converting the plaintext string "Hello World" using a predetermined hash algorithm. At the second time when the ciphertext string corresponding to the plaintext string "Hello World" is called for, the look-up operation is no longer needed and the ciphertext string may be directly retrieved from the cache. As such, the compiling process is simplified and the loading speed of a program is improved. The code example is as follows:

```
#define DECRYPT(text) \
[ ] ( )->const char* \
{ \
static const char* pData = \
GetDecryptText(Hash::Calculate(MAKE_STATIC(text)));\
return pData; \
}( )
```

In the above code segment, by means of the lambda anonymous function MAKE_STATIC(text), the plaintext string that is already called for the first time is stored in the cache buffer, so that in subsequent uses of this string, it is recalled directly from the cache buffer without being looked up from the dictionary.

Figure 5:
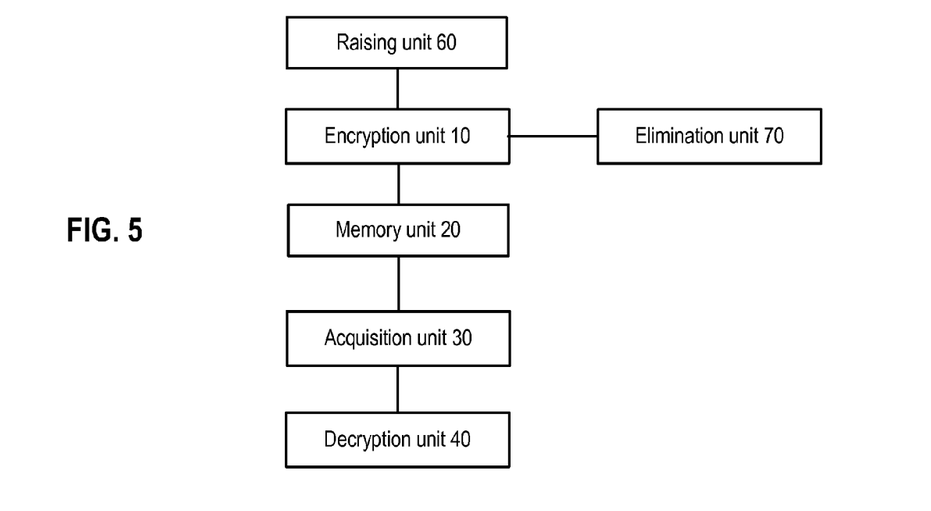
FIG. 5 is an exemplary apparatus for providing encryption and decryption of plaintext strings in a program file in accordance with some embodiments.

FIG. 5 is a schematic view of the apparatus for providing string encryption and decryption in a program file in accordance with some embodiments. The apparatus may serve as a preferred embodiment of the apparatus shown in FIG. 1. As shown in FIG. 5, the apparatus for string encryption and decryption of this embodiment includes an encryption unit 10, a memory unit 20, an acquisition unit 30, a decryption unit 40, a raising unit 60 and an elimination unit 70.

The function of the encryption unit 10, memory unit 20, acquisition unit 30 and decryption unit 40 in this embodiment is same as that of the encryption unit 10, memory unit 20, acquisition unit 30 and decryption unit 40 of the embodiment shown in FIG. 1, and related description will not be repeated herein.

The raising unit 60 is used to raise a plaintext string into a static constant with the lambda anonymous function, before the plaintext string is encrypted into a ciphertext string. Before encrypting the plaintext string, it's also needs to be preprocessed. As the plaintext strings include static constant strings and non-static constant strings, after the /OPT:REF optimization option is enabled in the linker, all the plaintext strings that are static constants and not in use will be eliminated.

However, the implicit type of the plaintext strings that directly written in the source code are non-static constants.

Therefore, to allow the linker to eliminate all the plaintext strings from the output of the linker, the plaintext strings that are non-static constants need to be raise into static constants. The following approach may be adopted to raise the plaintext strings to static constants:

```
static const char text[ ]= "Hello World";
printf("%d", Hash:: Calculate(text));
```

In the above code segment, the variable "text" will be optimized to be a static constant hash value, since there is no other reference to this variable in the source code, the variable will be eliminated upon linking. The lambda anonymous function may also be used raise the plaintext strings to static constants. In some embodiments, by adopting the lambda anonymous function to raise the plaintext strings to static constants, the coding process is more convenient. An example of using the raising unit 60 and adopting the lambda anonymous function to raise the plaintext strings to static constants is as follows:

```
[ ] ( )->const char*
{
static const char tmp[ ]= "Hello World";
return tmp;
}
```

As "Hello World" is not allowed to be directly written in the code of "printf", the lambda expression is used to convert "Hello World" into a static form. In above code segment, the lambda expression is used to simplify the raising process, this expression may be further packed with a macro, as follows:

```
#define MAKE_STATIC(text) \
[ ] ( )->const char* \
{ \
static const char tmp[ ]= text; \
return tmp; \
}( )
```

In practice, the macro in above code segment may be edited as a single line instead of multiple lines. The code segment modified with the lambda anonymous function may resemble the following statement:
printf("% d", Hash::Calculate(MAKE_STATIC("Hello World")));

In the above statement, the plaintext string has been raised to a static constant, which will be eliminated upon the linking process by of the linker.

The elimination unit 70 is used to eliminate the static constants with the linker after the plaintext strings are encrypted into ciphertext strings. With the raising unit 60, the plaintext strings that are non-static constants are raised to static constants, therefore, the raised plaintext strings in the source code will all be static constants, the elimination unit 70 thus can eliminate the static constants in the code through the linker, so as to eliminate the plaintext strings thoroughly in the output executable code, for the purpose of encryption.

In some embodiments, the decryption unit 40 is used to decrypt a ciphertext string and put the result into a pre-allocated buffer during the loading process of an executable file. When the executable file (such as a .DLL or .EXE file)

is being loaded into memory, the decryption unit 40 will automatically decrypt all the ciphertext strings into the pre-allocated buffer.

The reflection tool is able to scan for and calculate the length of a ciphertext string, therefore the decrypted code may be directly generated in the dictionary file, for example:

```
...
// "ObjectDestroy"
char_a0x7CCBF43E[14] = { 0 };
bool_taga0x7CCBF43E = Decrypt(_a0x7CCBF43E, "!~_ )^)`)-)~(~~`)-(~(_(!)&(");
// "ObjectEnter"
char_a0x121B746E[12] = { 0 };
bool_taga0x121B746E = Decrypt(_a0x121B746E, "!~_ )^)`)-)~(`~@)~(`)_(");
// "ObjectLeave"
char_a0xBA73ECD9[12] = { 0 };
bool_taga0xBA73ECD9 = Decrypt(_a0xBA73ECD9, "!~_ )^)`)-)~($~`)=))( )");
...
```

In the above code, three processes of encryption and decryption for strings are listed. For example, the plaintext string "ObjectDestroy" is stored in a buffer corresponding to "char_a0x7CCBF43E[14]", wherein 14 represents the length of the code, the code "bool_taga0x7CCBF43E=Decrypt(_a0x7CCBF43E, "!~_)^))-)~(~~)-(~(_(!)&(")" represents the process of decrypting this code. "ObjectEnter" and "ObjectLeave" have similar decryption processes, and related description will not be repeated herein.

Regarding the above code segment, the first parameter of the Decrypt function is the buffer for the decrypted plaintext string, the length of the buffer can be automatically calculated using the reflection tool. The second parameter of the Decrypt function is the ciphertext string. With these codes, during the loading of the executable file, the ciphertext string can be automatically restored to be the plaintext string and stored in the corresponding buffer.

In some embodiments, as all the plaintext strings have been encrypted and stored into the corresponding buffer at the moment when the loading starts. When using the hash value to look up the encrypted strings, it only needs to return the buffer address corresponding to the hash value. In this embodiment, with the reflection tool, a look-up function for a plaintext string is further generated, the code is as follows:

```
constchar* GetDecryptText(unsigned int hash)
{
  switch (hash)
  {
  ...
  case 0x7CCBF43E: return_a0x7CCBF43E;
  case 0x121B746E: return_a0x121B746E;
  case 0xBA73ECD9: return_a0xBA73ECD9;
  ...
  }
}
```

In the above code segment, the piece of code "case 0x7CCBF43E: return _a0x7CCBF43E" represents using the hash value 0x7CCBF43E to call the forgoing decrypted code "ObjectDestroy"; the piece of code "case 0x121B746E: return _a0x121B746E" represents using the hash value 0x121B746E to call the forgoing decrypted code "ObjectEnter"; the piece of code "case 0xBA73ECD9: return _a0xBA73ECD9" represents using the hash value 0xBA73ECD9 to call the forgoing decrypted code "ObjectLeave". As the plaintext strings have been decrypted into the corresponding buffer when the program is being loaded, therefore it can be directly recalled from the buffer and the overhead is reduced.

In some embodiments, the complete coding for the corresponding marking macro may resemble the following:

```
#define DECRYPT(text) \
GetDecryptText(Hash::Calculate(MAKE_STATIC(text)));
```

Then the plaintext string can be output with the following code, but the corresponding plaintext string is invisible in the corresponding DLL or EXE file.

printf(DECRYPT("Hello World"));

In the above description, although the embodiments shown in FIGS. 1-5 are focused on different aspects and features, different combinations of the features described with respect to FIGS. 1-5 may be implemented in various embodiments. In some embodiments, all of the features described with respect to FIGS. 1-5 are implemented in the same apparatus.

In some embodiments, a method for providing string encryption and decryption in a program file can be operated on a computer processing apparatus. For example, each of the exemplary apparatus described with respect to FIGS. 1-5 may be a computer processing apparatus performing the method(s) described below.

Figure 6:
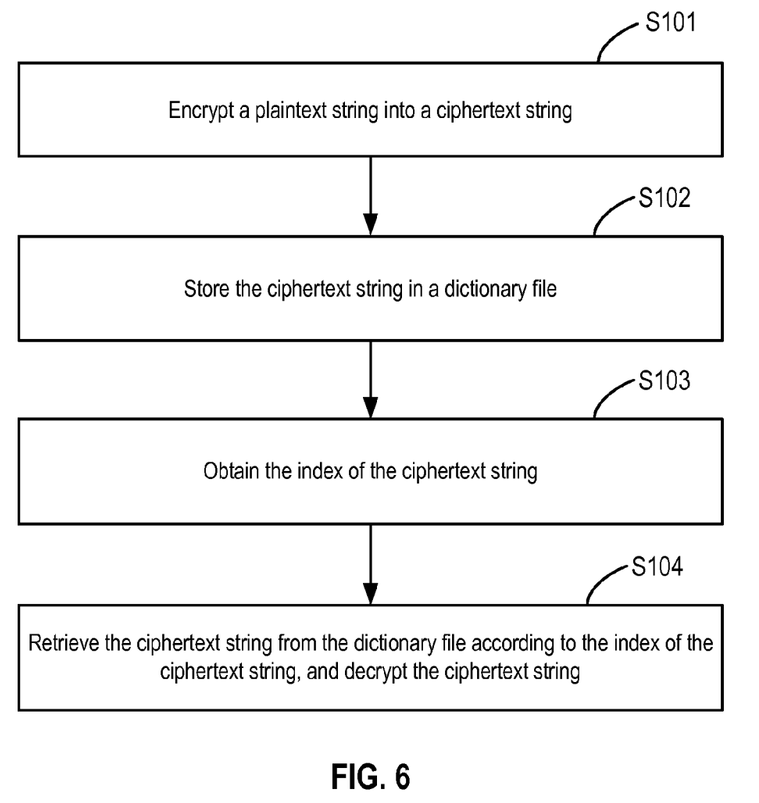
FIG. 6 is a flow chart of an exemplary method for providing encryption and decryption of plaintext strings in a program file in accordance with some embodiments.

FIG. 6 is a flow chart of a method for providing string encryption and decryption in accordance with some embodiments. As shown, the method for providing string encryption and decryption in a program file include the following steps:

Step S101, encrypting a plaintext string into a ciphertext string.

In the source code of a program that runs on a user terminal, numerous constant strings are often used, which may appear in a final output binary file (e.g., the .exe file or .dll file) in the form of plaintext. These constant strings that appear in form of plaintext are plaintext strings. For example: The string "Hello World" that appears in the executable code is a plaintext string. The plaintext strings can be strings in the C++ source code developed on the VS development platform, strings in the C or C++ code developed on Turbo C (an integrated development environment), or strings in source code of other languages that is developed in the other development environments. For encrypting the plaintext string into a corresponding ciphertext string, firstly, the source code is scanned via a reflection tool to discover the plaintext strings contained in the source code, and then the discovered plaintext strings are encrypted into corresponding ciphertext strings. For example: the plaintext string "Hello World" in the code is discovered in the source code through scanning by the reflection tool, and then, the string "Hello World" is encrypted. For example, the plaintext string "Hello World" is encrypted and turned into a ciphertext string "HoWd". Since the ciphertext string "HoWd" substantially lacks of readability, the encrypted ciphertext string is difficult to crack.

Step S102, storing the ciphertext string in a dictionary file. The ciphertext string obtained by encrypting the plaintext string is stored into a dictionary file, the dictionary file may be a dictionary file automatically generated in the encryption process of the plaintext string, also may be a dictionary file prepared prior to the encryption.

In some embodiments, the ciphertext string is directly stored in the dictionary file, and the original plaintext string may be obtained with a decryption algorithm. This way, the operation risk in replacing the plaintext string with a ciphertext string in the source code during code compilation can be avoided, also the situation of losing the original plaintext string due to errors in the decryption process can be avoided. Meanwhile, since the ciphertext string is directly stored in the dictionary file, the mismatch between the code in debugging and the original code is avoided.

Step S103, obtaining the index of the ciphertext string.

The index of the ciphertext string is obtained from the conversion of the plaintext string corresponding to the ciphertext string during a code compiling process, the index of the ciphertext string is used to look up the ciphertext string corresponding to the plaintext string when the code is running, so as to recall the corresponding ciphertext string in a code decryption process. The index of the ciphertext string may be a hash value obtained through a hash algorithm. The index of the ciphertext string may be a character code for marking and index function obtained through other algorithms. The hash algorithm may be based on FNV-1a, and realized by the C++ template programming.

Step S104, retrieving the ciphertext string from the dictionary file according to the index of the ciphertext string, and decrypting the ciphertext string.

A ciphertext string and the index of the ciphertext string are both generated from the corresponding plaintext string, wherein the ciphertext string is from the encryption of the plaintext string, and the index of the ciphertext string is from processing the corresponding plaintext string through a certain algorithm. Such algorithm may be hash algorithm, or other algorithms capable of obtaining marking values or index values. Therefore, with the index of the ciphertext string, the ciphertext string may be directly retrieved from the dictionary file that stores the ciphertext string, and the ciphertext string is directly decrypted.

In some embodiments, the encrypted ciphertext string is stored into the dictionary file and an index of the ciphertext string is obtained, the ciphertext string is retrieved from the dictionary file according to the index of the ciphertext string, so as for decrypting the ciphertext string. In some embodiments, as the ciphertext string is directly stored in the dictionary file, therefore the problem of code mismatching due to replacing the plaintext string with a ciphertext string in the original source code is avoided. The problem of losing the original code which is difficult to recover can be avoided.

In some embodiments, after encrypting the plaintext string into a ciphertext string, the method for providing string encryption and decryption further includes: compiling the ciphertext string to obtain an executable file. Compiling the ciphertext string to obtain the executable file can be carried out by compiling the source file in which the plaintext string has been encrypted into the ciphertext string. In some embodiments, the plaintext string can be encrypted using an encryption function in the source code. Retrieving the ciphertext string from the dictionary file according to the index of the ciphertext string and decrypting the ciphertext string include: decrypting the ciphertext string and putting the result into a pre-allocated buffer during the loading process for the executable file.

In some embodiments, the executable file made from the compilation of the ciphertext string may be a DLL file, also may be an EXE file. The executable file may be loaded into memory by a computer operating system. At the time of the executable file being loaded, the ciphertext string in the dictionary file is decrypted into the original plaintext string, and stored in the pre-allocated buffer, therefore, there's no need to decrypt the ciphertext string in real-time during the execution process, such that the problem of frequent calling the ciphertext string during program execution will be avoided, and the performance of the program will not be influenced. Meanwhile, the extra overhead for real-time decryption under a multithreaded mode will be avoided, which improve the efficiency of the program.

In some embodiments, before encrypting the plaintext string into a ciphertext string, the method for providing string encryption and decryption further include: raising the plaintext string to a static constant. It is more convenient and complete way to eliminate the plaintext strings that are static constants by the use of a lambda anonymous function.

Before encrypting the plaintext string, it needs to be preprocessed. As the plaintext strings in the source code may include static constant strings and non-static constant strings. After the /OPT:REF optimization option is enabled in the linker, all the plaintext strings that are static constants and not in use will be eliminated from the output executable code. However, the implicit type of a plaintext string that is directly written in the source code is a non-static constant; therefore, to allow the linker to eliminate all the plaintext strings in the output executable file, the plaintext strings that are non-static constants need to be raised to become static constants. This can be accomplished by using a function (e.g., Make_Static) in the source code.

In some embodiments, after encrypting the plaintext string into the ciphertext string, the method for providing string encryption and decryption further include: eliminating the static constants in the executable code with a linker.

With a raising unit, the plaintext strings that are non-static constants are raised to static constants, therefore, the raised plaintext strings in the code are all static constants, and an elimination unit thus can eliminate the static constants in the code through the linker, so as to eliminate the plaintext strings thoroughly in the output executable code.

Figure 7:
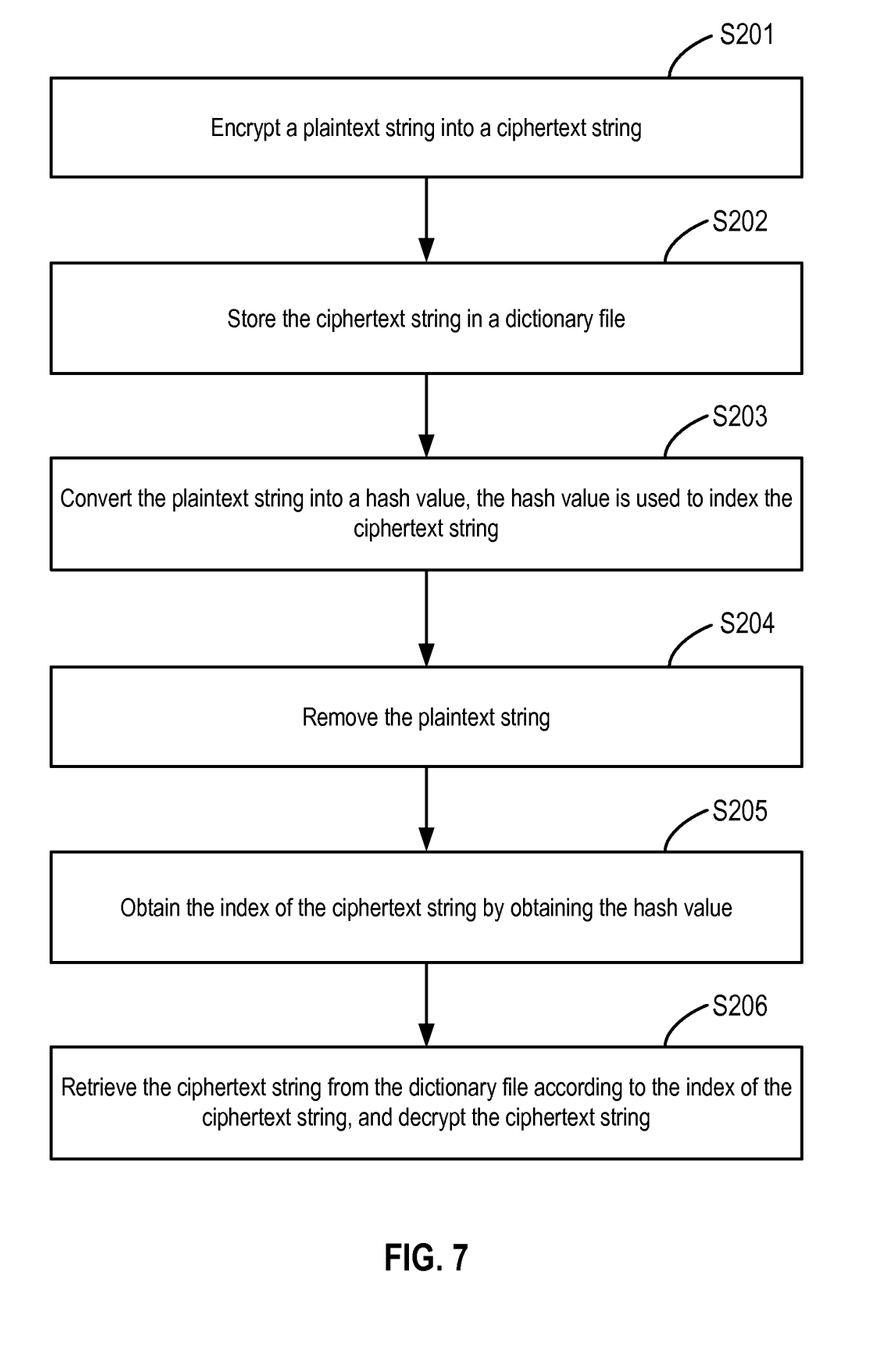
FIG. 7 is a flow chart of an exemplary method for providing encryption and decryption of plaintext strings in a program file in accordance with some embodiments.

FIG. 7 is a flow chart of a method for providing string encryption and decryption in a program file in accordance with some embodiments. This embodiment may serve as a preferred embodiment of that shown in FIG. 6. The method of this embodiment include the following steps:

Step S201, encrypting a plaintext string into a ciphertext string.

Step S202, storing the ciphertext string in a dictionary file.

Step S203, converting the plaintext string into a hash value, the hash value is used to index the ciphertext string in the dictionary file.

The hash value serves as the index of the ciphertext string in the dictionary file and is used to look up the ciphertext string in the dictionary file when the program is loaded, wherein the hash value is obtained from the conversion of the plaintext string during code compiling. A hash value is obtained by mapping a binary value of arbitrary length into a smaller binary value of fixed length through a hash algorithm. The hash value is a unique and compact numerical representation of a piece of data (e.g., the plaintext string). For example, when there is a plaintext string in the source code, if one of the letters in the plaintext string is changed, the hash value produced according to the plaintext string before the change is different from the hash value produced according to the plaintext string after the change. Therefore, each of the hash value used as the index of a respective ciphertext string is unique, which can be used to accurately to look up and retrieve the ciphertext string corresponding to the index from the dictionary file.

Step S204, removing the plaintext string from the source code.

Since the plaintext strings are constant strings, which may be easily read from the code, thus the entire executable application program composed of the codes is easy to be cracked. Therefore, during the encryption process for a plaintext string in the source code, after a conversion module converting a plaintext string into a hash value, the corresponding plaintext string in the source code should be removed. The plaintext string may be a static constant, and also may be a non-static constant. After the plaintext string is removed by a removal module, the plaintext string can no longer be directly readable from the executable file by a human user, thus the security of encryption is ensured.

Step S205, obtaining the index of the ciphertext string by obtaining the hash value. The hash value is the index of the ciphertext string in the dictionary file; therefore, obtaining the hash value is obtaining the index of the ciphertext string.

Step S206, retrieving the ciphertext string from the dictionary file according to the index of the ciphertext string, and decrypting the ciphertext string at program loading time.

A conversion module converts the plaintext string into the hash value during code compiling. The hash algorithm used in the conversion process may be FNV-0 algorithm, FNV-1 algorithm or FNV-1a algorithm. During compilation, the hash algorithm for converting the plaintext strings is unfolded, wherein the compiler adopted in the embodiment of the present application support C++0x standard or above, and all the related details of the compiler are in accordance with MSVC10.

Wherein, step S201, step S202 and step S206 are same with step S101, step S102 and step S104 in the flow chart of the method for string encryption and decryption according to the embodiment shown in FIG. 6, and related description will not be repeated herein.

Figure 8:
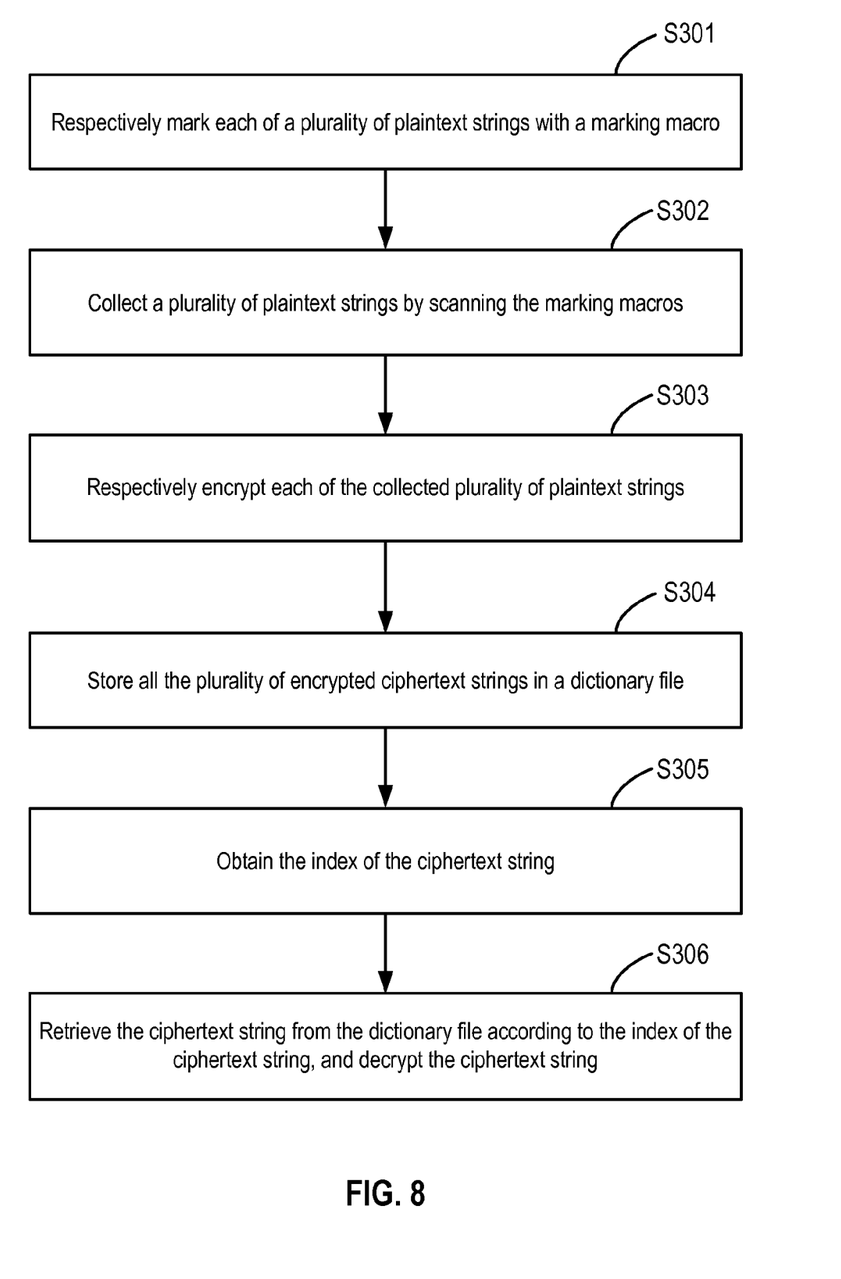
FIG. 8 is a flow chart of an exemplary method for providing encryption and decryption of plaintext strings in a program file in accordance with some embodiments.

FIG. 8 is a flow chart of the method for providing string encryption and decryption in a program file in accordance with some embodiments. This embodiment may serve as a preferred embodiment of that shown in FIG. 6. In some embodiments, there are a plurality of plaintext strings in the source code, and the method include the following steps:

Step S301, respectively marking each of a plurality of plaintext strings with a marking macro in the source code.

During the encoding, a marking module marks each plaintext string with a marking macro, wherein one plaintext string corresponds to one marking macro, which is used to recognize each different plaintext string, so as to encrypt and obtain the corresponding ciphertext strings according to different plaintext strings. For example:

Printf(DECRYPT("Hello World"));

In this piece of code, the marking macro "DECRYPT" is used to mark the plaintext string "Hello World" in the source code, therefore, in the subsequent scanning process, the plaintext string "Hello World" may be recognized by just scanning the marking macro "DECRYPT" in the source code. This way, it will be convenient to collect all the plaintext strings in the source code.

Step S302, collecting the plurality of plaintext strings by scanning for the marking macros in the source code.

A reflection tool adds special macros or comments in the source code developed in a usual manner by a developer. Before each compilation, the reflection tool will scan for these special marks (e.g., the names of the marking macros) and automatically generate the dictionary entries for the ciphertext strings corresponding to the plaintext strings marked by the marking macros. For example, for the source code DECRYPT("Hello World") with a marking macro "DECRYPT", the reflection tool will scan and detect the "DECRYPT" before each compilation, so as to obtain the plaintext string "Hello World" in the source code.

After the marking module marks the plurality of plaintext strings in the source code, and a collection module scans for the marking macros with the reflection tool to collect the plurality of plaintext strings, the encryption module encrypts the collected plaintext strings respectively. After the marking module marks the plurality of plaintext strings, the plurality of plaintext strings are collected by scanning the marking macros, so as conveniently for encrypting the collected plaintext strings and other processes.

Step S303, respectively encrypting each of the collected plurality of plaintext strings.

The plurality of plaintext strings collected by the collection module are then encrypted via an encryption module into a plurality of ciphertext strings, wherein each one of the plurality of plaintext strings has a corresponding ciphertext string. After the encryption, the collected plurality of plaintext strings are converted into the corresponding plurality of ciphertext strings.

Step S304, storing all the plurality of encrypted ciphertext strings in a dictionary file.

The plurality of ciphertext strings obtained by encrypting a plurality of plaintext strings are stored into the dictionary file, which is for looking up the ciphertext strings at program loading time. In some embodiments, it is preferable to use a hash value as the ciphertext string index, so as to look up a ciphertext string in the dictionary file. As one plaintext string corresponds to one unique hash value, therefore, by using a hash value as the index of a ciphertext string, it can accurately index the ciphertext string corresponding to a plaintext string.

Step S305, obtaining the index of the ciphertext string at program loading time.

Step S306, retrieving the ciphertext string from the dictionary file according to the index of the ciphertext string, and decrypting the ciphertext string.

Wherein, step S305 and step S306 are same with step S103 and step S104 in the flow chart of the method for providing string encryption and decryption according to the embodiment shown in FIG. 6, and related description will not be repeated herein.

Based on the above descriptions, a method of providing encryption and decryption of plaintext strings in a program file, includes: at a device having one or more processors and memory: marking each of a plurality of plaintext strings in a source file with a respective marking macro (e.g., Decrypt); scanning (e.g., using a reflection tool) for the respective marking macros to identify the plurality of plaintext strings in the source code; generating a respective ciphertext string for each of the plurality plaintext strings that have been identified; and storing the plurality of plaintext strings in a dictionary file, where each plaintext string is indexed by a respective hash value computed from the plaintext string, and where the respective hash value for each of the plaintext strings is used to retrieve the respective ciphertext string of the plaintext string from the dictionary during program execution.

In some embodiments, the method further includes compiling the source code containing the plurality of plaintext strings marked by the respective marking macros, where the compiling causes each of the plurality of plaintext strings to be converted to the respective hash value of the plaintext string in an executable file, and where during loading of the executable file, the respective hash value for each of the plaintext strings is used to retrieve the respective ciphertext string of the plaintext string from the dictionary.

In some embodiments, the method further includes during loading of the executable file for program execution, retrieving the respective ciphertext string of each of the plurality of plaintext strings from the dictionary using the respective hash value for the plaintext string. In some embodiments, the loading of the executable file is performed on a different device from the device that does the creation of the executable file (e.g., the marking, and compiling). For example, the marking, generating, storing, and compiling steps are performed at a developer's machine, while the loading of the executable file and retrieving of the ciphertext string, and the decryption of the ciphertext string are performed on a device that runs the executable file (e.g., a customer's machine). In some embodiments, for each ciphertext string retrieved during loading of the executable file: the device decrypts the ciphertext string to obtain the plaintext string corresponding to the ciphertext string; and stores the obtained plaintext string in a buffer. In some embodiments, for each ciphertext string that has been decrypted during loading of the executable file: during execution of the executable file, the device retrieves the plaintext string corresponding to the ciphertext string from the buffer (rather than trying to retrieve it from the dictionary and decrypt it again).

In some embodiments, as shown in the earlier examples, the marking macro includes a hash function for converting a plaintext string parameter into the respective hash value of the plaintext string parameter. In some embodiments, during compilation of the source code, the respective the plaintext string parameter of the marking macro is converted to the respective hash value of the plaintext string parameter in the executable code of the source code (as a result, the plaintext string is no longer visible to the human user in the executable code). In some embodiments, the marking macro further includes an anonymous function for making the respective plaintext string parameter a static constant.

Other details are described above with respect to FIGS. 1-8.

Figure 9:
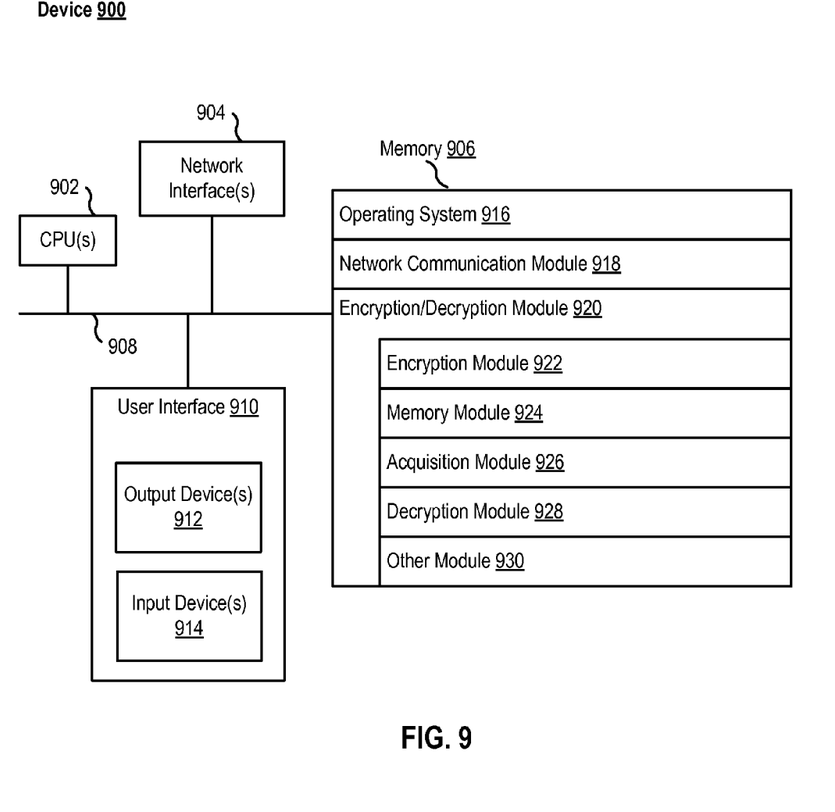
FIG. 9 is a block diagram of an exemplary system for providing encryption and decryption of plaintext strings in a program file in accordance with some embodiments.

FIG. 9 is a block diagram illustrating a device 900 for providing encryption and decryption of plaintext strings in a program file in accordance with some embodiments. The device 900, typically, includes one or more processing units (CPUs) 902, one or more network interfaces 904, memory 906, and one or more communication buses 908 for interconnecting these components (sometimes called a chipset). The device 900 also includes a user interface 910. User interface 910 includes one or more output devices 912 that enable presentation of content, including one or more speakers and/or one or more visual displays. User interface 910 also includes one or more input devices 914, including user interface components that facilitate user input such as a keyboard, a mouse, a voice-command input unit or microphone, a touch-screen display, a touch-sensitive input pad, a gesture capturing camera, or other input buttons or controls. Memory 906 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 906, optionally, includes one or more storage devices remotely located from CPU(s) 902. Memory 906, or alternately the non-volatile memory device(s) within memory 906, includes a non-transitory computer readable storage medium. In some implementations, memory 906, or the non-transitory computer readable storage medium of memory 906, stores the following programs, modules, and data structures, or a subset or superset thereof:

- an operating system 916 including procedures for handling various basic system services and for performing hardware dependent tasks; and
- a network communication module 918 for connecting the device 900 to other computing devices connected to one or more networks via one or more network interfaces 904 (wired or wireless).

In some embodiments, memory 906 also includes encryption/decryption module 920. The module 920 includes, but is not limited to:
- an encryption module 922 for encrypting plaintext strings into ciphertext strings;
- a memory unit 924 for storing the ciphertext strings in a dictionary file;
- an acquisition unit 926 for obtaining the index of a ciphertext string;
- a decryption unit 928 for retrieving a ciphertext string from the dictionary file according to the index of the ciphertext string, and decrypting the ciphertext string;
- other modules 930, for performing other functions of the device as described herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 906, optionally, stores a subset of the modules and data structures identified above. Furthermore, memory 906, optionally, stores additional modules and data structures not described above.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of providing encryption and decryption of plaintext strings in a program file, comprising:
   at a first device having one or more processors and memory:
      marking each of a plurality of plaintext strings in a source file, the source file comprising source code, with a respective marking macro, wherein the plurality of plaintext strings remain visible in the source after being marked by the respective marking macros, and wherein the respective marking macros for one or more plaintext strings of the plurality of plaintext strings that are non-static variables further raise said one or more plaintext strings to one or more respective static constants in the source code;
      scanning for the respective marking macros to identify the plurality of plaintext strings in the source code;
      generating a respective ciphertext string for each of the plurality plaintext strings that have been identified;

storing the plurality of ciphertext strings in a dictionary file, wherein each ciphertext string is indexed in the dictionary file by a respective hash value computed from the plaintext string corresponding to the ciphertext string, and wherein the respective hash value for each of the plaintext strings is used to retrieve the respective ciphertext string of the plaintext string from the dictionary during program execution; and compiling and linking the plurality of ciphertext strings and the source file that is marked by the respective marking macros to obtain an executable file, wherein the plurality of plaintext strings are not visible in the executable file, and wherein the plurality of ciphertext strings are decrypted and loaded into a pre-allocated buffer during loading of the executable file at a second device, distinct from the first device, during program execution.

2. The method of claim 1, wherein:

compiling the source code containing the plurality of plaintext strings marked by the respective marking macros causes each of the plurality of plaintext strings to be converted to the respective hash value of the plaintext string in the executable file, and wherein during loading of the executable file, the respective hash value for each of the plaintext strings is used to retrieve the respective ciphertext string of the plaintext string from the dictionary.

3. The method of claim 1, further comprising:

during loading of the executable file for program execution, retrieving the respective ciphertext string of each of the plurality of plaintext strings from the dictionary using the respective hash value for the plaintext string;

for each ciphertext string retrieved during loading of the executable file:
decrypting the ciphertext string to obtain the plaintext string corresponding to the ciphertext string; and
storing obtained plaintext string in the pre-allocated buffer.

4. The method of claim 3, further comprising:

for each ciphertext string that has been decrypted during loading of the executable file:
during execution of the executable file, retrieving the plaintext string corresponding to the ciphertext string from the pre-allocated buffer.

5. The method of claim 1, wherein the respective marking macros include a hash function for converting a plaintext string parameter into the respective hash value of the plaintext string parameter.

6. The method of claim 5, wherein during compilation of source code in the source file, the plaintext string parameter of each respective marking macro is converted to the respective hash value of the plaintext string parameter in executable code corresponding to the source code.

7. A first system for providing encryption and decryption of plaintext strings in a program file, comprising:

one or more processors; and memory storing instructions, the instructions, when executed by the one or more processors, cause the processors to perform operations comprising:
marking each of a plurality of plaintext strings in a source file, the source file comprising source code, with a respective marking macro, wherein the plurality of plaintext strings remain visible in the source code after being marked by the respective marking macros, and wherein the respective marking macros for one or more plaintext strings of the plurality of plaintext strings that are non-static variables further raise said one or more plaintext strings to one or more respective static constants in the source code;

scanning for the respective marking macros to identify the plurality of plaintext strings in the source code;

generating a respective ciphertext string for each of the plurality plaintext strings that have been identified;

storing the plurality of ciphertext strings in a dictionary file, wherein each ciphertext string is indexed in the dictionary file by a respective hash value computed from the plaintext string corresponding to the ciphertext string, and wherein the respective hash value for each of the plaintext strings is used to retrieve the respective ciphertext string of the plaintext string from the dictionary during program execution; and compiling and linking the plurality of ciphertext strings and the source file that is marked by the respective marking macros to obtain an executable file, wherein the plurality of plaintext strings are not visible in the executable file, and wherein the plurality of ciphertext strings are decrypted and loaded into a pre-allocated buffer during loading of the executable file at a second system, distinct from the first system, during program execution.

8. The system of claim 7, wherein:

compiling the source code containing the plurality of plaintext strings marked by the respective marking macros causes each of the plurality of plaintext strings to be converted to the respective hash value of the plaintext string in the executable file, and wherein during loading of the executable file, the respective hash value for each of the plaintext strings is used to retrieve the respective ciphertext string of the plaintext string from the dictionary.

9. The system of claim 7, wherein the operations further comprise:

during loading of the executable file for program execution, retrieving the respective ciphertext string of each of the plurality of plaintext strings from the dictionary using the respective hash value for the plaintext string;

for each ciphertext string retrieved during loading of the executable file:
decrypting the ciphertext string to obtain the plaintext string corresponding to the ciphertext string; and
storing obtained plaintext string in the pre-allocated buffer.

10. The system of claim 9, wherein the operations further comprise:

for each ciphertext string that has been decrypted during loading of the executable file:
during execution of the executable file, retrieving the plaintext string corresponding to the ciphertext string from the pre-allocated buffer.

11. The system of claim 7, wherein the respective marking macros include a hash function for converting a plaintext string parameter into the respective hash value of the plaintext string parameter.

12. The system of claim 11, wherein during compilation of source code in the source file, the plaintext string parameter of each respective marking macro is converted to the respective hash value of the plaintext string parameter in executable code corresponding to the source code.

13. A non-transitory computer-readable medium having instructions stored thereon, the instructions, when executed by one or more processors of a first device, cause the processors to perform operations comprising:

marking each of a plurality of plaintext strings in a source file, the source file comprising source code, with a respective marking macro, wherein the plurality of plaintext strings remain visible in the source code after being marked by the respective marking macros, and wherein the respective marking macros for one or more plaintext strings of the plurality of plaintext strings that are non-static variables further raise said one or more plaintext strings to one or more respective static constants in the source code;

scanning for the respective marking macros to identify the plurality of plaintext strings in the source code;

generating a respective ciphertext string for each of the plurality plaintext strings that have been identified;

storing the plurality of ciphertext strings in a dictionary file, wherein each ciphertext string is indexed in the dictionary file by a respective hash value computed from the plaintext string corresponding to the ciphertext string, and wherein the respective hash value for each of the plaintext strings is used to retrieve the respective ciphertext string of the plaintext string from the dictionary during program execution; and compiling and linking the plurality of ciphertext strings and the source file that is marked by the respective marking macros to obtain an executable file, wherein the plurality of plaintext strings are not visible in the executable file, and wherein the plurality of ciphertext strings are decrypted and loaded into a pre-allocated buffer during loading of the executable file at a second device, distinct from the first device, during program execution.

14. The computer-readable medium of claim 13, wherein the operations further comprise:

compiling the source code containing the plurality of plaintext strings marked by the respective marking macros causes each of the plurality of plaintext strings to be converted to the respective hash value of the plaintext string in the executable file, and wherein during loading of the executable file, the respective hash value for each of the plaintext strings is used to retrieve the respective ciphertext string of the plaintext string from the dictionary.

15. The computer-readable medium of claim 13, wherein the operations further comprise:

during loading of the executable file for program execution, retrieving the respective ciphertext string of each of the plurality of plaintext strings from the dictionary using the respective hash value for the plaintext string;

for each ciphertext string retrieved during loading of the executable file:

decrypting the ciphertext string to obtain the plaintext string corresponding to the ciphertext string; and storing obtained plaintext string in the pre-allocated buffer.

16. The computer-readable medium of claim 15, wherein the operations further comprise:

for each ciphertext string that has been decrypted during loading of the executable file:

during execution of the executable file, retrieving the plaintext string corresponding to the ciphertext string from the pre-allocated buffer.

17. The computer-readable medium of claim 13, wherein the respective marking macros include a hash function for converting a plaintext string parameter into the respective hash value of the plaintext string parameter.

18. The computer-readable medium of claim 17, wherein during compilation of source code in the source file, the plaintext string parameter of each respective marking macro is converted to the respective hash value of the plaintext string parameter in executable code corresponding to the source code.

* * * * *